Dec. 26, 1961  F. W. BANKA  3,014,546
LAWN MOWER
Filed Dec. 8, 1958  3 Sheets-Sheet 3
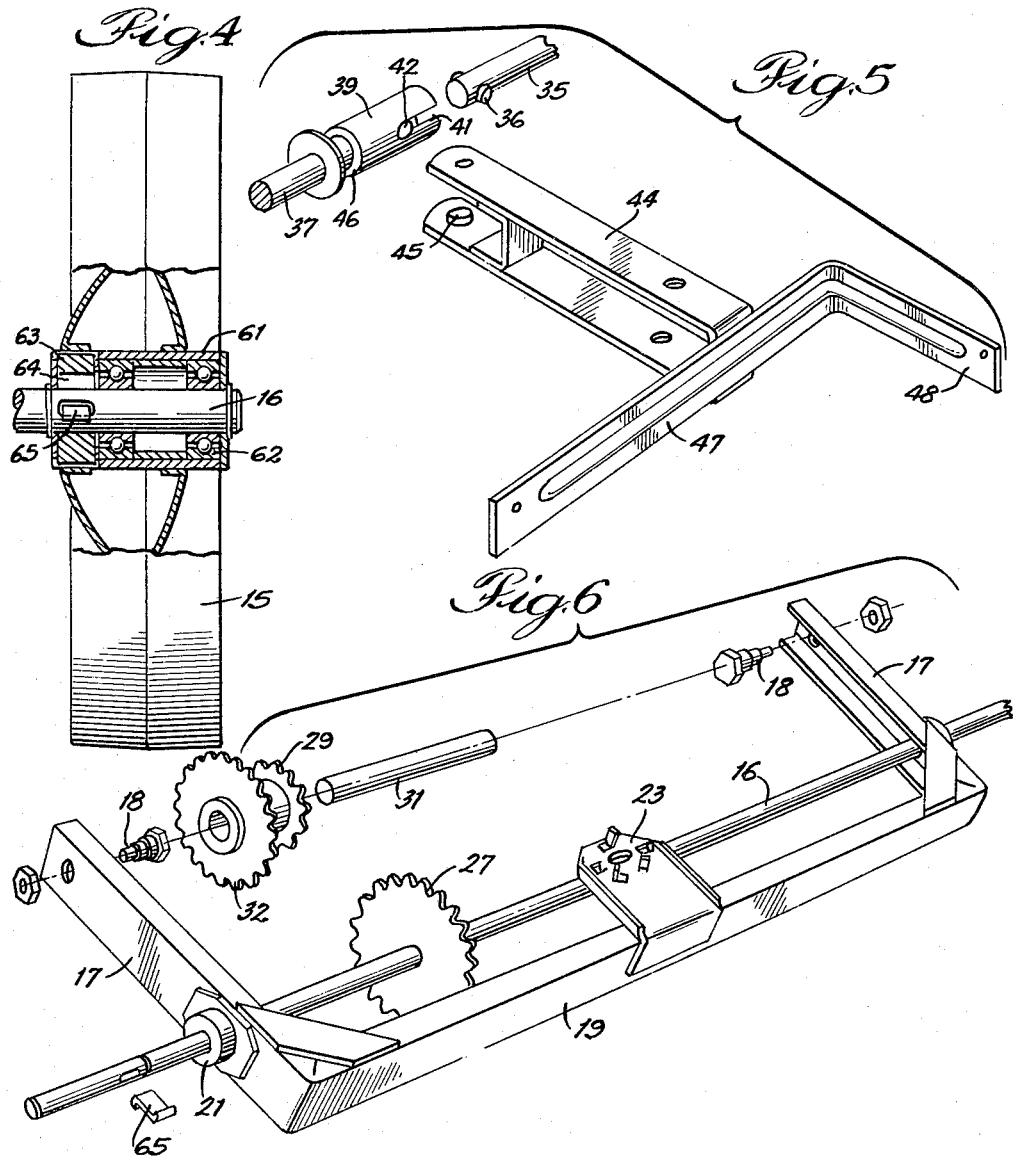
INVENTOR:
Frank W. Banka,
BY Bair, Freeman & Molinare
ATTORNEYS.

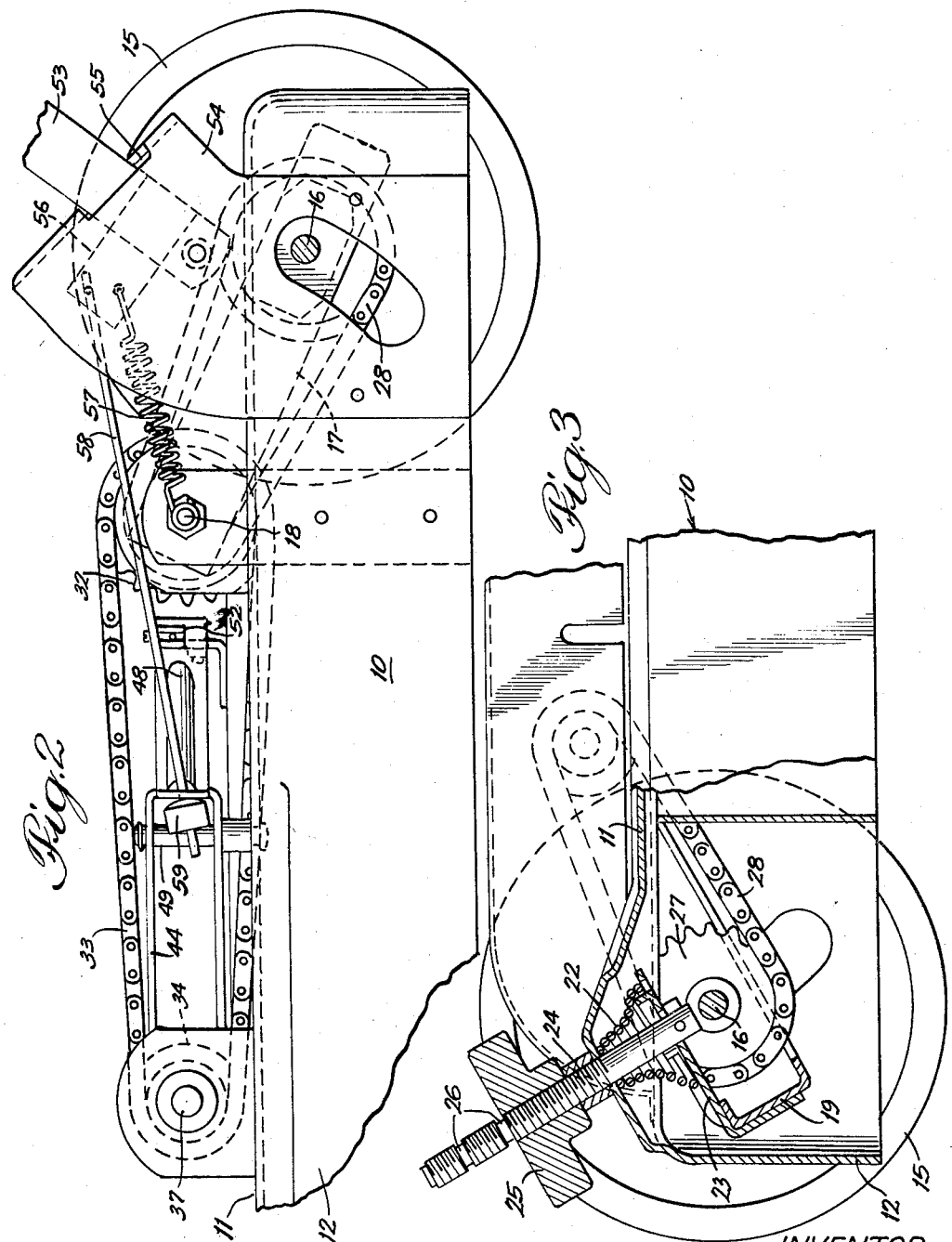

United States Patent Office 3,014,546
Patented Dec. 26, 1961

3,014,546
LAWN MOWER
Frank W. Banka, Chicago, Ill., assignor to Engineered Products Inc., Dubuque, Iowa, a corporation of Iowa
Filed Dec. 8, 1958, Ser. No. 778,847
2 Claims. (Cl. 180—19)

This invention relates to a lawn mower and more particularly to a power driven lawn mower and to wheel driving and adjusting means therefor.

In power driven lawn mowers, it is desirable, if not necessary, that an adjustable connection to the wheels be provided so that the height of the cut can easily be adjusted without interfering with driving of the wheels. It is also highly desirable to make provisions for disengaging the driving connection to the wheels easily and quickly so that the lawn mower will not tend to run away from the operator under any conditions. A principal object of the present invention is to provide a power lawn mower embodying these features.

Another object is to provide a lawn mower in which the supporting means for the main axle is adjustably connected to the body frame adjacent to the center thereof so that a certain amount of weaving or float can occur to accommodate irregularities in the ground.

According to a feature of the invention, the axle is supported by a U-shaped frame pivotally mounted on the body frame with a compression spring engaging the supporting frame adjacent its center to urge the wheels downward and with an adjustable tension element limiting downward movement of the wheels.

According to another feature the axle is drivably connected to a driving shaft on the body frame coaxial with the pivotal axis of the supporting frame and which is in turn connected through a disengageable clutch to a driving motor, such as an internal combustion engine.

A further object is to provide a lawn mower in which the wheels are connected to the driving motor through a disengageable clutch which may be disengaged by downward slinging of the lawn mower handle.

The above and other objects and features of the invention will be more readily apparent from the following description when read in connection with the accompanying drawings, in which:

FIGURE 2 is a partial side elevation on the line 2—2 of FIGURE 1 with the cover removed;

FIGURE 3 is a partial section on the line 3—3 of FIGURE 1;

FIGURE 4 is a partial section through a wheel;

FIGURE 5 is a disassembled perspective view of the clutch and clutch operating lever; and FIGURE 6 is a disassembled perspective view of the wheel supporting frame and axle.

Figure 1:
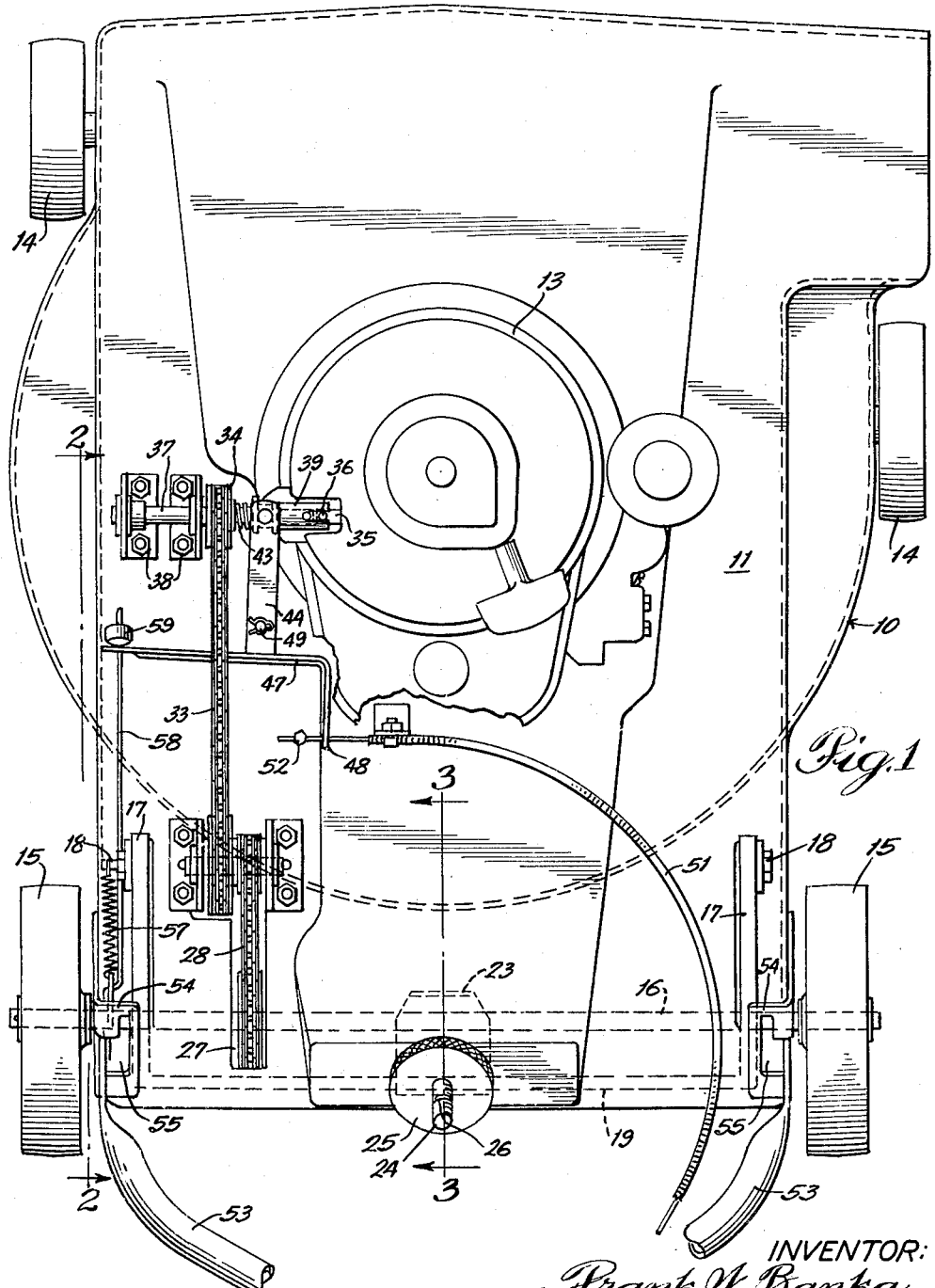
FIGURE 1 is a top plan view of a lawn mower embodying the invention with parts of the cover broken away.

The lawn mower as shown comprises a body frame, indicated generally at 10, which may be made of sheet metal and which is preferably formed with a flat top 11 and with depending flanges 12 around its periphery. The top plate 11 may support a driving motor, such as a conventional internal combustion engine 13 with its shaft vertical and the shaft may extend through the top plate 11 to drive a blade rotating in a horizontal plane, as is conventional. It will be understood, however, that many of the features of the invention could be employed on lawn mowers of a type other than the rotary blade type.

The body frame is supported for movement over the ground on one or more front wheels 14 which may be journalled to the front part of the frame on fixed axes and on a pair of rear wheels 15 which are adjustably connected to the frame for adjustment of the height of cut.

The rear wheels 15 are supported on an axle 16 adjacent to the rear end of the body frame and extending completely across the width of the body frame to support the wheels 15 adjacent its sides.

For adjustably mounting the wheels 15, the construction as best seen in FIGURES 3 and 6 is employed. As shown, the axle 16 is journalled in arms 17 which are pivotally mounted on pivot pins 18 on the main body frame spaced forward of the rear end thereof. The arms 17 are joined by a cross bar 19 to form a U-shaped supporting member with the axle 16 being journalled in the arms in bearings 21 at a point adjacent to and parallel to the cross bar 19.

The U-shaped supporting frame is urged to swing in a downward direction by a compression spring 22 seating on a bracket 23 secured to the cross bar 19 centrally of its length and at its upper end seating in a raised portion of the upper flat plate 11 of the body frame. A tension element 24, shown as a threaded rod is secured at its lower end to the bracket 23 and extends through an opening in the top plate to receive an adjusting nut 25. By adjusting the nut 25 the downward limit of swing of the U-shaped frame can be adjusted to vary the height of cut of the lawn mower. Preferably the threaded rod 24 is provided with notches 26 at intervals in its length through which C-washers or the like can be inserted to hold the nut 25 at predetermined positions for predetermined heights of cut.

The axle 16 is adapted to be driven to propel the lawn mower over the ground and for this purpose is provided with a sprocket 27. A chain 28 meshes with the sprocket 27 and with a sprocket 29 secured to an axle 31. The axle 31 is coaxial with the pivots 18 for the U-shaped supporting frame and also carries a second sprocket 32 connected by a chain 33 with a sprocket 34 on a fixed axis on the frame.

The sprocket 34 is adapted to be driven by the engine 13 for which purpose the engine is provided with a takeoff shaft 35 projecting from one side thereof and provided with a cross driving pin 36 near its free end. The sprocket 34 is secured to a shaft 37 coaxial with the takeoff shaft 35 and rotatably mounted in fixed brackets 38 on the body frame.

To connect the shafts 37 and 35 a clutch sleeve 39, as best seen in FIGURE 5, is slidably mounted on the shaft 37 and is formed at its outer end with slots 41 embracing a cross pin 42 on the shaft 37 and adapted to receive the cross pin 36 on the shaft 35. A compression coil spring 43 around the shaft 37 and acting between the sprocket 34 and the collar 39 normally urges the clutch collar 39 toward the shaft 35 to engage the clutch and to connect the shafts 35 and 37. With the clutch engaged and the motor 13 running, the sprocket 34 will be driven and will drive the intermediate shaft 31 and the axle 16 through the several sprockets and chains. It will be understood that the sprockets may be made of different sizes, as shown, to effect a desired speed reduction so that the lawn mower will be propelled at a proper rate of speed with respect to the rate of rotation of the blade.

In order to disengage the clutch so that the lawn mower may remain stationary with the engine running, a clutch operating lever, as best seen in FIGURES 1 and 5, is provided. This lever, as shown, comprises an arm 44 which is preferably bifurcated to span the clutch sleeve 39 and which preferably carries pins 45 to be received in an annular groove 46 on the clutch sleeve. The arm 44 is connected to a bell crank lever having an arm 47 normal to the arm 44 and an arm 48 parallel to the arm 44. The lever assembly is mounted on a pivot pin 49 adjacent to the junction of the arms 44 and 47.

The clutch may be manually disengaged at will for which purpose a Bowden wire 51 is provided having its end sliding through an opening near the free end of the bell crank arm 48 and carrying a stop projection 52 to engage the arm 48. The Bowden wire may extend to a convenient position for operation on the lawn mower handle which is shown only in part so that the operator may by pulling on the wire rock the clutch release lever counterclockwise, as seen in FIGURE 1, to shift the clutch sleeve 39 to the left out of engagement with the pin 36 on shaft 35. When the Bowden wire is again released or pressed forward, the parts will assume the position shown in FIGURE 1 with the spring 43 shifting the clutch sleeve 39 to the right to again engage the clutch.

According to the present invention, the clutch may additionally be operated by downward swinging movement of the lawn mower handle. As best seen in FIGURES 1 and 2, the lawn mower handle is provided by a pair of rods or pipes 53 pivoted to the main body frame adjacent to the rear end thereof and extending upwardly and rearwardly therefrom. The rods or pipes are preferably bent toward each other and may join a conventional operating handle, not shown. As best seen in FIGURE 2, each rod or pipe 53 is pivoted to a handle supporting bracket 54 rigidly secured to the body frame and formed with an upper flange having a guide slot 55 therein to limit swinging movement of the handle.

Each handle rod or pipe 53 carries a short projecting bracket 56 to which a tension spring 57 may be attached and may be anchored at the opposite end to a convenient point on the body frame fully or partially to counterbalance the weight of the handle. In addition, one of the brackets 56 has pivoted thereto a rod 58 which extends loosely through an opening in the bell crank arm 47 and carries a stop projection 59 to engage the bell crank arm.

When the handle in its normal raised operating position, as shown in FIGURE 2, the rod 58 will be moved forward so that the clutch operating lever assembly can swing clockwise under the influence of the spring 43 to clutch-engaged position. If the handle is swung downwardly relative to the body frame, the tension rod 58 will be moved to the right, as seen in FIGURE 2, swinging the clutch operating lever counterclockwise and disengaging the clutch. It will be noted that if the lawn mower tends to move faster than the operator, the normal reaction of the operator's hand on the handle will swing it downward and disengage the clutch so that the lawn mower can never run away. The spring 57 may be made of such strength that it will hold the handle in its upper position or may be made weaker so that it will merely partially counterbalance the weight of the handle. In the latter case, if the handle is released it will swing downward under its own weight to disengage the clutch.

It will be seen that the present construction provides a relatively simple and yet highly efficient lawn mower in which the height of cut can easily be adjusted and in which the control of the propulsion drive means is effected very simply and in a very natural manner. Due to the manner of mounting and adjusting the drive wheels with the U-shaped supporting frame held down only at its center, a certain amount of weaving is permitted allowing the axle to tilt to accommodate irregularities in the ground. Also due to the fact that the wheel support is urged downwardly by a spring with a tension element limiting downward movement thereof the wheel support is always cushioned to provide for better operation.

In a preferred construction, the wheels may be connected to the axle 16 through free wheel clutches so that the lawn mower can always be pushed forward manually when desired. As best seen in FIGURE 4, each wheel comprises a hub 61 supported on bearings 62 on the axle 16. The wheel hub carries a cam ring 63 provided with three recesses 64 selectively to receive the ends of a key 65 slidable transversely through a slot in the axle. When the axle tends to turn forward relative to the wheel, the key 65 will be cammed into one of the recesses 64 and will engage a relatively abrupt shoulder thereon to drive the wheel. When the wheel tends to turn forward relative to the axle, the trailing edges of the recesses 64 will cam the key 65 inward so that the wheel can freely overrun the axle. It will be understood, of course, that any other desired type of overruning clutch could be utilized, the clutch illustrated being only the preferred construction.

While one embodiment of the invention has been shown and described herein, it will be understood that it is illustrative only and not to be taken as a definition of the scope of the invention, reference being had for this purpose to the appended claims.

What is claimed is:

1. In a lawn mower, a body frame, an axle extending across the body frame adjacent to one end thereof, wheels on the axle supporting it on the ground and lying adjacent to opposite sides of the body frame, a U-shaped supporting frame pivoted at its ends on the body frame adjacent to opposite sides thereof with its center member parallel to the axle, the axle being journalled in the supporting frame spaced from and parallel to the pivotal axis thereof, a driving shaft on the body frame coaxial with the pivotal axis of the supporting frame, a driving connection between the driving shaft and the axle, and a single adjustable hold down unit connecting the body frame centrally of its width to the central part of the center member of the supporting frame so that the axle can tilt relative to the body frame about the hold down unit.

2. In a lawn mower, a body frame, a driving motor on the body frame, an axle extending across the body frame adjacent to one end thereof, wheels on the axle adjacent to opposite sides of the body frame, a U-shaped supporting frame pivoted at its ends on the body frame on an axis parallel to and spaced from the axle, an adjustable hold down unit connecting the body frame centrally of its width to the center part of the supporting frame to adjust the wheel height, the supporting frame and axle being tiltable relative to the body frame about the hold down unit, a driving shaft on the body frame coaxial with the pivotal axis of the supporting frame, a driving connection between the driving shaft and the axle, a driving connection between the driving motor and the driving shaft including a releasable clutch, a clutch operating lever pivoted on the body frame, a handle pivoted on one end of the body frame on a horizontal axis, and a connection between the handle and the clutch operating lever to release the clutch when the handle is swung downward.

References Cited in the file of this patent

UNITED STATES PATENTS

| | | |
|---|---|---|
| 1,430,219 | Dominguez | Sept. 26, 1922 |
| 2,138,239 | Irgens | Nov. 29, 1938 |
| 2,198,897 | White | Apr. 30, 1940 |
| 2,722,281 | Falkenberg | Nov. 1, 1955 |
| 2,728,582 | Knarzer | Dec. 27, 1955 |
| 2,736,389 | Phelps | Feb. 28, 1956 |
| 2,776,446 | Brace | Jan. 8, 1957 |
| 2,776,844 | Wilkin | Jan. 8, 1957 |
| 2,818,270 | Cataline | Dec. 31, 1957 |
| 2,824,415 | Frazier | Feb. 25, 1958 |
| 2,852,083 | Cavanaugh | Sept. 16, 1958 |